Oct. 14, 1952  M. CLAUSEN ET AL  2,613,689
PILOT-OPERATED VALVE
Filed March 3, 1948
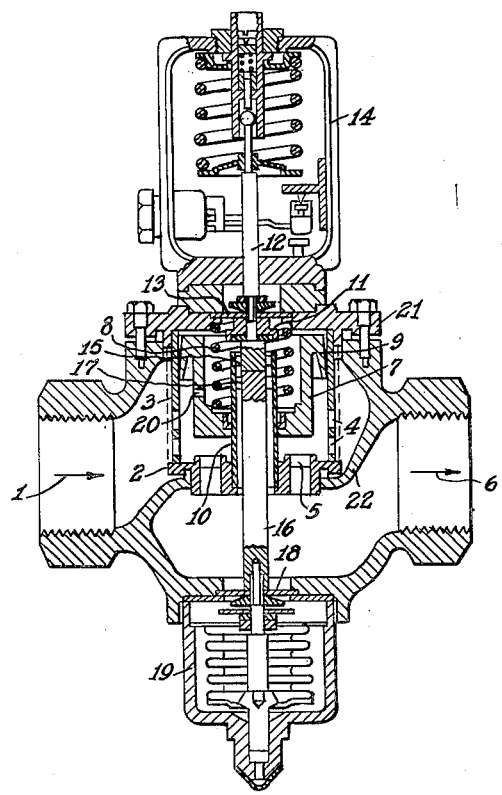
INVENTORS
MADS CLAUSEN AND
CHRISTIAN MATTHIESEN
BY
*Robert E Burns*
ATTORNEY.

Patented Oct. 14, 1952

2,613,689

UNITED STATES PATENT OFFICE 2,613,689

PILOT-OPERATED VALVE

Mads Clausen and Christian Matthiesen, Nordborg, Denmark

Application March 3, 1948, Serial No. 12,813
In Denmark October 18, 1947

2 Claims. (Cl. 137—671)

1

The invention relates to a liquid valve of the type opening and closing automatically in accordance with the difference in pressure on the inlet and outlet sides of the valve.

The characteristic feature of the invention is the provision of a valve having a valve body in the form of a spring-loaded piston, said piston being connected with a collar and a guide or pilot valve which is placed interiorly of the collar, having a passage so adjusted in relation to one or more by-passes in the valve body, that its spring will keep the valve closed as long as the flow through the guide-valve is so small that a pressure may be maintained in the interior of the valve body exceeding the pressure on the outlet side by a given value. This valve is made highly sensitive so that the main valve body can move independently and with a much greater range of motion than the body of the pilot-valve.

According to the invention a valve spindle is made in two parts, being made of two rods with their ends pressing against each other, and each actuated by its own control mechanism, whereby the resultant of the forces exerted by these two mechanisms will actuate the rods and thereby the body of the guide-valve. This valve will be especially suitable for either hand or thermo-control, inasmuch as the two control members may act one on each end of the body of the guide-valve.

The body of the main valve may, according to the invention, preferably consist of caoutchouc. It is in itself no novelty to produce valve bodies of this material, but in the present case caoutchouc is especially suitable, because not only in the lower part at the valve seat but also in the upper part where the collar fits into and is guided by the perforated cylinder, liquid tightness is required, a requirement which will be best fulfilled when the valve body possesses the properties characteristic of caoutchouc.

Further, according to the invention, a guide cylinder for the main valve may preferably be affixed to a flange bolted to the valve casing and rest against the valve seat which is provided with radial fins and carries a central bushing to which the internal guide tappet or pipe of the valve body is fitted. This is the best way of obtaining a foolproof mounting of the valve and a rigid guidance on its seat of the main valve body, the collar of which may suitably consist of a sleeve of leather, caoutchouc or other resilient material.

The drawing shows an axial cross-section through an embodiment of a valve according to the invention.

2

At the position shown in the drawing of the parts of the valve, the valve is open, the liquid flowing in the direction indicated by the arrow 1 passing through a filter 2, surrounding a cylinder 3 with large openings 4, which allow ample liquid to flow into the interior of the cylinder, whence the liquid flows out through a valve seat 5, and leaves the valve at the arrow 6.

If the difference in pressure between the inlet and outlet sides of the valve is diminished below a given value, a pilot spring 8 placed inside the caoutchouc valve body 7 will press the valve body against its seat 5 and thus close the main valve.

The valve body 7 is guided in its motion at its top by a collar 9 sliding airtight in the cylinder 3 and at its lower end by an apertured wall fitting around a central guide pipe 10 fixed to the seat 5, which guide pipe at its top forms the seat of a pilot valve, with a valve body 11, fixed to a valve spindle 12 which through a caoutchouc diaphragm 13 is carried up into a control mechanism 14. The part of the valve spindle 12 which lies inside the pipe 10 is provided with fins 15 and rests with its end against the end of another spindle 16, which is likewise provided with fins 17 in the pipe 10 and which through a caoutchouc diaphragm 18 is carried down to a thermo-control mechanism 19.

The valve body 7 is provided with one or more by-passes 20 through which the liquid from the inlet side of the valve may at all times flow into the interior of the body 7 and thence pass through the pilot-valve and the pipe 10 to the outlet side of the main valve. The position of the pilot-valve will determine the pressure in the interior of the body 7, due to the fact that if the pilot-valve is kept closed, the main valve will also remain closed by the pressure of the spring 8. If, however, the pilot-valve is opened to an increasing extent the liquid pressure in and above the valve-body 7 will be diminished to such an extent in relation to the pressure below the collar 9 that the valve-body 7 will be lifted against the pressure of the spring 8. As soon as the liquid has passed through the seat 5, it will with the full pressure of the inlet side act on the entire bottom surface of the piston 7 which will be lifted. At the same time the difference in pressure above and below the valve body 7 will be diminished.

The main valve will now remain open until the pilot valve is closed, when the pressure in and above the valve-body 7 will be equal to the pressure against the bottom of the body 7 and the collar 9 so that the spring 8 will be able to close the main valve by forcing the valve body 7 down against its seat 5.

The travel of the body of the pilot-valve is, as will be seen, far less than the travel of the main valve body. It will thus be possible to make the valve highly sensitive, so that it will open and close at very small changes in the pilot-valve body, and the valve is therefore especially suitable for thermo control.

As will appear from the drawing, the seat 5 is fastened to the partition 22 of the valve, whereas the cylinder 3 is fastened to a flange 21 bolted to the valve casing, which will hold the lower edge of the cylinder 3 pressed against the seat 5 so that the proper centering of the pipe 10 in the cylinder 3 will be obtained.

Having now described our invention, what we claim as new and desire to secure by Letters Patent is:

1. A valve of the character described, comprising a casing having an inlet chamber and an outlet chamber, a valve seat between said inlet and outlet chambers, a hollow open tube fixed in the center of said valve seat to open into said outlet chamber and extending perpendicularly from said valve seat into said inlet chamber, a cylinder in said inlet chamber co-axially surrounding said tube and mounted between said valve seat and the wall of the inlet chamber opposite said valve seat, said cylinder being provided with holes in the part of its wall nearest said valve seat, a hollow valve member open at one end and penetrated at its other end by said tube to be guided by the latter for sliding movement to and from sealing contact with said valve seat, spring means tending to press said valve member against said valve seat, said valve member being provided with a radially projecting annular flange portion adjacent its open end sealingly engaging the inner wall of said cylinder and with at least one aperture in its side wall connecting its interior with said inlet chamber, the open end of said tube inside said valve member being formed as an auxiliary valve seat, an auxiliary pilot valve cooperating with said seat, a control rod carrying said pilot valve and extending outwardly and penetrating the wall of said inlet chamber, a second control rod in alignment with and abutting the first and extending through said cylinder and outlet chamber penetrating the wall of the latter, both said control rods being guided for axial movement, control means on the outside of said casing comprising spring means acting on said first control rod tending to close said pilot valve, and automatic control means on the outside of said casing acting on said second rod in opposition to said last mentioned spring means.

2. A valve of the character described, comprising a casing having an inlet chamber, an outlet chamber and a removable cover member bolted onto said inlet chamber, an annular valve seat between said inlet and outlet chambers in axial alignment with said cover member and having a central bushing carried by radial fins, a hollow open tube fixed into said bushing to extend from said valve seat into said inlet chamber, said tube being coaxial with said valve seat, a cylinder inside said inlet chamber fixed onto said cover member and resting with its opposite end against said valve seat co-axially with said tube, said cylinder being provided with holes in the part of its wall nearest said valve seat, a hollow valve member open at one end and penetrated at its other end by said tube to be guided by the latter for sliding movement to and from sealing contact with said valve seat, spring means tending to press said valve member against said valve seat, said valve member being provided with a radially projecting annular flange portion adjacent its open end sealingly engaging the inner wall of said cylinder and with at least one aperture in its side wall connecting its interior with said inlet chamber, at least said flange portion of said valve member consisting of a resilient material, the open end of said tube inside said valve member being formed as an auxiliary valve seat, an auxiliary pilot valve cooperating with said seat, at least one central control rod acting on said pilot valve, said control rod being coaxial with said tube and penetrating the wall of said casing for axial movement, a part of said rod extending inside said tube and having radial projections guided along the inner wall of said tube, and control means on the outside of said casing controlling the displacement of said rod.

MADS CLAUSEN.
CHRISTIAN MATTHIESEN.

REFERENCES CITED

The following references are of record in the file of this patent:

UNITED STATES PATENTS

| Number | Name | Date |
|---|---|---|
| 846,059 | Schmid | Mar. 5, 1907 |
| 1,502,541 | Beggs | July 22, 1924 |
| 1,955,495 | Hack | Apr. 17, 1934 |
| 2,075,029 | Duncan | Mar. 30, 1937 |

FOREIGN PATENTS

| Number | Country | Date |
|---|---|---|
| 79,133 | Sweden | of 1933 |